US011168577B2

United States Patent
Fox

(10) Patent No.: US 11,168,577 B2
(45) Date of Patent: Nov. 9, 2021

(54) GEARBOX RATIO CHANGE

(71) Applicant: Hamilton Sundstrand Corporation, Charlotte, NC (US)

(72) Inventor: Paul F. Fox, Loves Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 467 days.

(21) Appl. No.: 16/169,839

(22) Filed: Oct. 24, 2018

(65) Prior Publication Data

US 2020/0131924 A1    Apr. 30, 2020

(51) Int. Cl.

| F01D 15/08 | (2006.01) |
| F01D 15/10 | (2006.01) |
| F01D 15/12 | (2006.01) |
| F16H 1/20 | (2006.01) |
| F16H 37/04 | (2006.01) |
| F16H 61/22 | (2006.01) |
| F16H 57/023 | (2012.01) |

(52) U.S. Cl.
CPC ............. *F01D 15/08* (2013.01); *F01D 15/10* (2013.01); *F01D 15/12* (2013.01); *F16H 1/206* (2013.01); *F16H 37/04* (2013.01); *F16H 57/023* (2013.01); *F16H 61/22* (2013.01); *F05D 2260/4031* (2013.01)

(58) Field of Classification Search
CPC .......... F01D 15/08; F01D 15/10; F01D 15/12; F16H 57/23; F16H 1/206; F16H 37/04; F16H 61/122; F05D 2260/4031; F05D 2230/80; F02C 7/32
See application file for complete search history.

(56) References Cited

U.S. PATENT DOCUMENTS

| 4,976,669 A | 12/1990 | Jones |
| 9,845,735 B2 | 12/2017 | Duong et al. |
| 2007/0173365 A1 | 7/2007 | Linet et al. |
| 2012/0006137 A1 | 1/2012 | Short et al. |
| 2016/0230843 A1 | 8/2016 | Duong et al. |

(Continued)

FOREIGN PATENT DOCUMENTS

EP    2060759 A2    5/2009

OTHER PUBLICATIONS

Manual Transmission, How it works? (https://www.youtube.com/watch?v=wCu9W9xNwtl) a Youtube video published on Mar. 4, 2015. (Year: 2015).*

(Continued)

*Primary Examiner* — Moshe Wilensky
(74) *Attorney, Agent, or Firm* — Carlson, Gaskey & Olds, P.C.

(57) ABSTRACT

A method of modifying an existing gearbox wherein the existing gearbox has an input shaft connected to drive a first idler gear. The first idler gear engages a gear for driving a fuel pump at a first speed. There is a first distance between a center point of the first idler gear and the fuel pump gear. The step includes replacing the first idler gear with a replacement first idler gear having a distinct number of teeth, and replacing the fuel pump gear with a replacement fuel pump gear having a distinct number of teeth such that a speed output to the fuel pump is distinct from the speed at the fuel pump with the existing gearbox. A gearbox is also disclosed.

16 Claims, 5 Drawing Sheets

(56) References Cited

U.S. PATENT DOCUMENTS

2017/0067367 A1     3/2017   Wojcik et al.
2018/0283281 A1    10/2018   Veilleux, Jr. et al.

OTHER PUBLICATIONS

Rebbechi, Brian et al., An Investigation of F/A-18 AMAD Gearbox Driveshaft Vibration, Airframes and Engines Division Aeronautical and Maritime Research Laboratory, DSTO-TN-0121, Nov. 1997, pp. 1-101.
Tata, P.E., Robert P., Basic Gear Fundamentals, Course No. M04-033, Credit: 4PDH, 2012, pp. 1-29.
European Search Report for EP Application No. 19205114.2 dated Apr. 6, 2020.

* cited by examiner

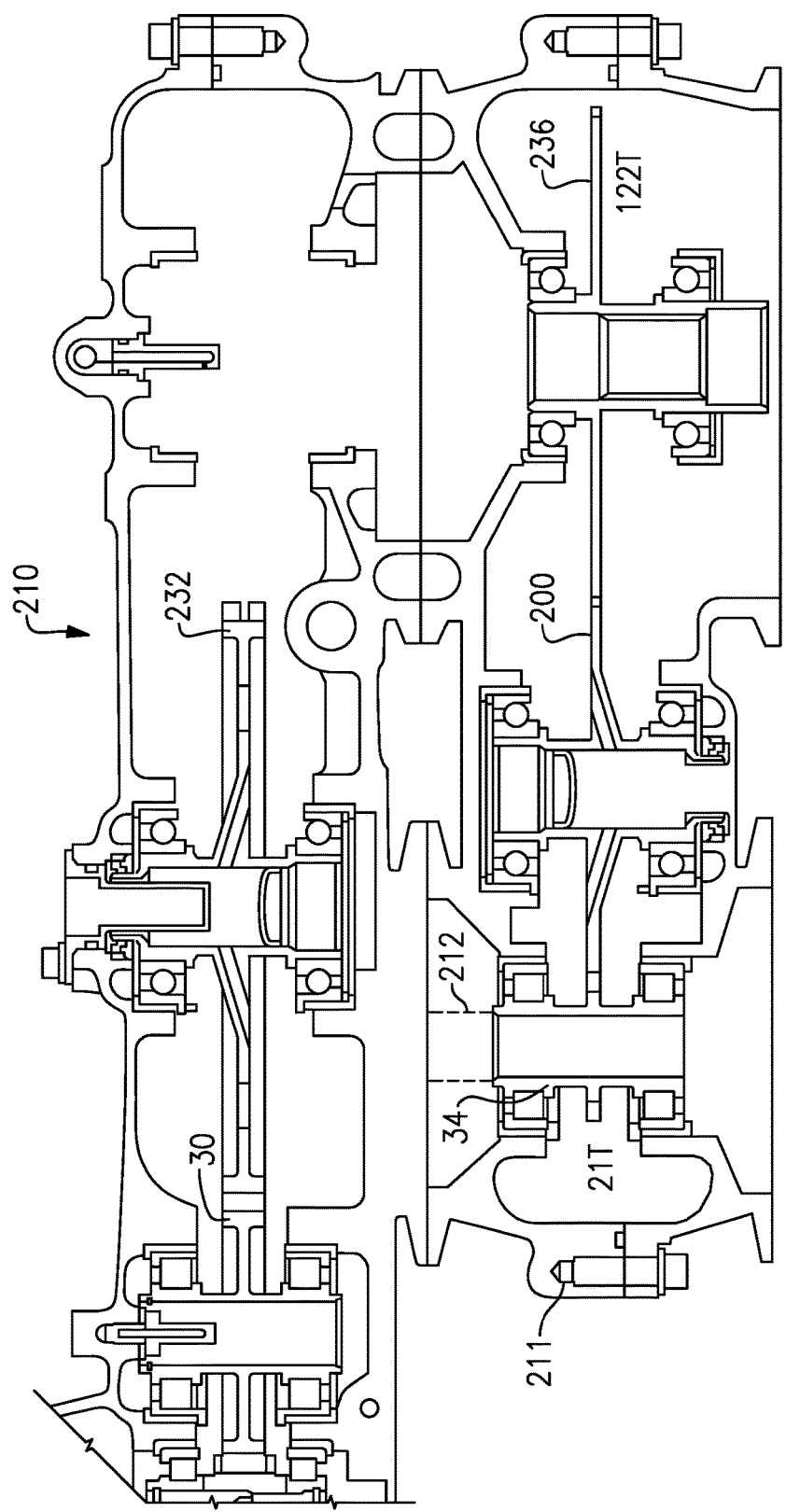
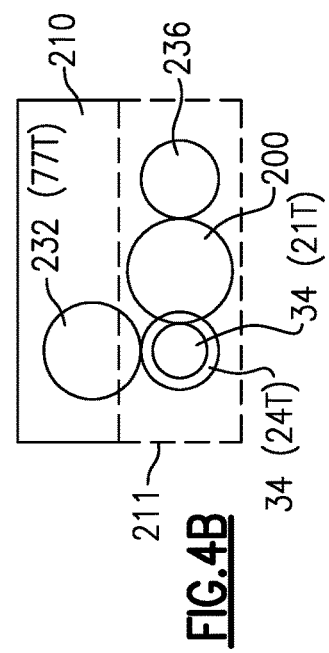
FIG.4A
FIG.4B

GEARBOX RATIO CHANGE

BACKGROUND

This application relates to a method for achieving a gear ratio change in an existing gearbox, and unique gearboxes formed by the method.

Gearboxes are known and provide a variety of speed ratios between an input and an output. In gas turbine engines, there are gearboxes that take in a drive input and provide varying rates of speed to any number of accessory applications.

As an example, a gearbox will include a plurality of gears for driving a plurality of pumps and a generator for supporting a gas turbine engine.

SUMMARY

A method of modifying an existing gearbox wherein the existing gearbox has an input shaft connected to drive a first idler gear. The first idler gear engages a fuel pump gear for driving a fuel pump at a first speed. There is a first distance between a center point of the first idler gear and the fuel pump gear. The step includes replacing the first idler gear with a replacement first idler gear having a distinct number of teeth, and replacing the fuel pump gear with a replacement fuel pump gear having a distinct number of teeth such that a speed output to at the fuel pump is distinct from the first speed.

A gearbox is also disclosed.

These and other features may be best understood from the following drawings and specification.

BRIEF DESCRIPTION OF THE DRAWINGS

FIG. 4A shows a detail of the second embodiment.

FIG. 4B shows a second view.

DETAILED DESCRIPTION

Figure 1:
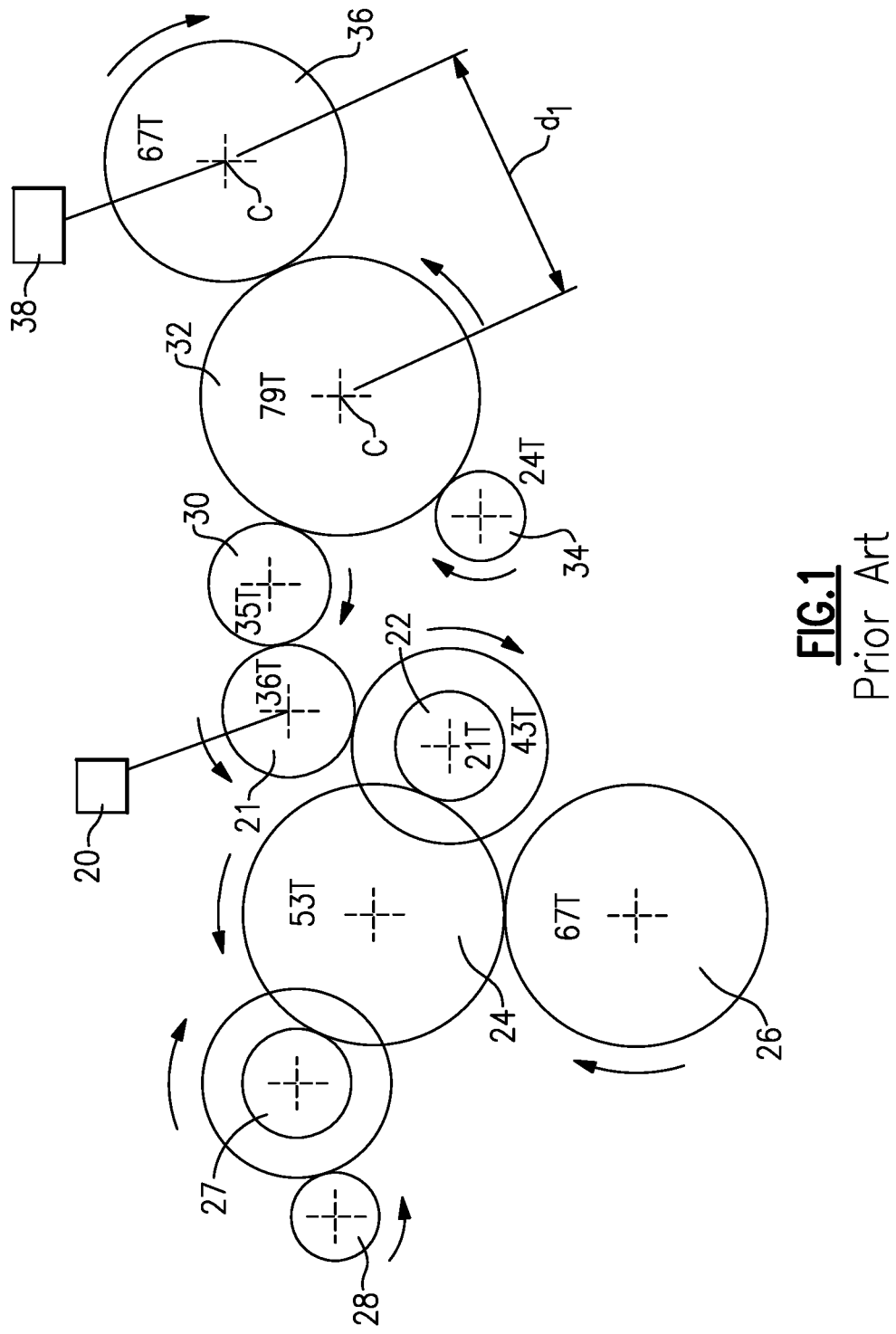
FIG. 1 schematically shows an existing gearbox assembly for a gas turbine engine.

FIG. 1 schematically shows a gearbox for use to support a number of pumps and generators in a gas turbine engine. As shown, a drive input 20 drives a gear 21 which engages a jackshaft 22. Gear 21 is a power takeoff shaft driven gear. Jackshaft gear 22 engages an idler gear 24 which, in turn, drives a gear 26 for driving a hydraulic pump. Jackshaft gear 22 is a compound idle gear, or an idler gear with two gears for a two-step gear reduction. Idler gear 24 further drives a jackshaft 27 and an ATS 28.

The gear 21 further drives an idler gear 30, which engages in and drives an idler gear 32. Idler gear 32 drives a generator gear 34 for driving a generator and a fuel pump gear 36 for driving a fuel pump 38. In this prior art gearbox, gear 32 has 79 teeth and gear 36 has 67 teeth.

As can be appreciated, the gears are mounted within a gearbox housing, and a distance $d_1$ between center point C of gear 32 and gear 36 is set for mount pads within that housing. In the gearbox shown in FIG. 1, the number of gear teeth is proportional to the sides of the gears 32 and 36.

In the gearbox shown in FIG. 1, the numbers of gear teeth are proportional to the sizes of the gears 32 and 36. More specifically, the number of teeth for a given gear is used with the diametral pitch of the gear to establish the pitch diameter of said gear. Diametral pitch is a term used to describe the relative size of a gear tooth. The pitch diameters are used to define the actual size of the tangent circles in the attached figures. The pitch diameters are always proportional to the numbers of teeth of their respective gears.

As can be appreciated, the number of gear teeth on the several gears shown in FIG. 1 results in a particular speed at the pump 38. Over time, it may be desirable to provide a pump 38 having a different speed. This is difficult to achieve without completely redesigning a gearbox, which may sometimes be undesirable.

Figure 2:
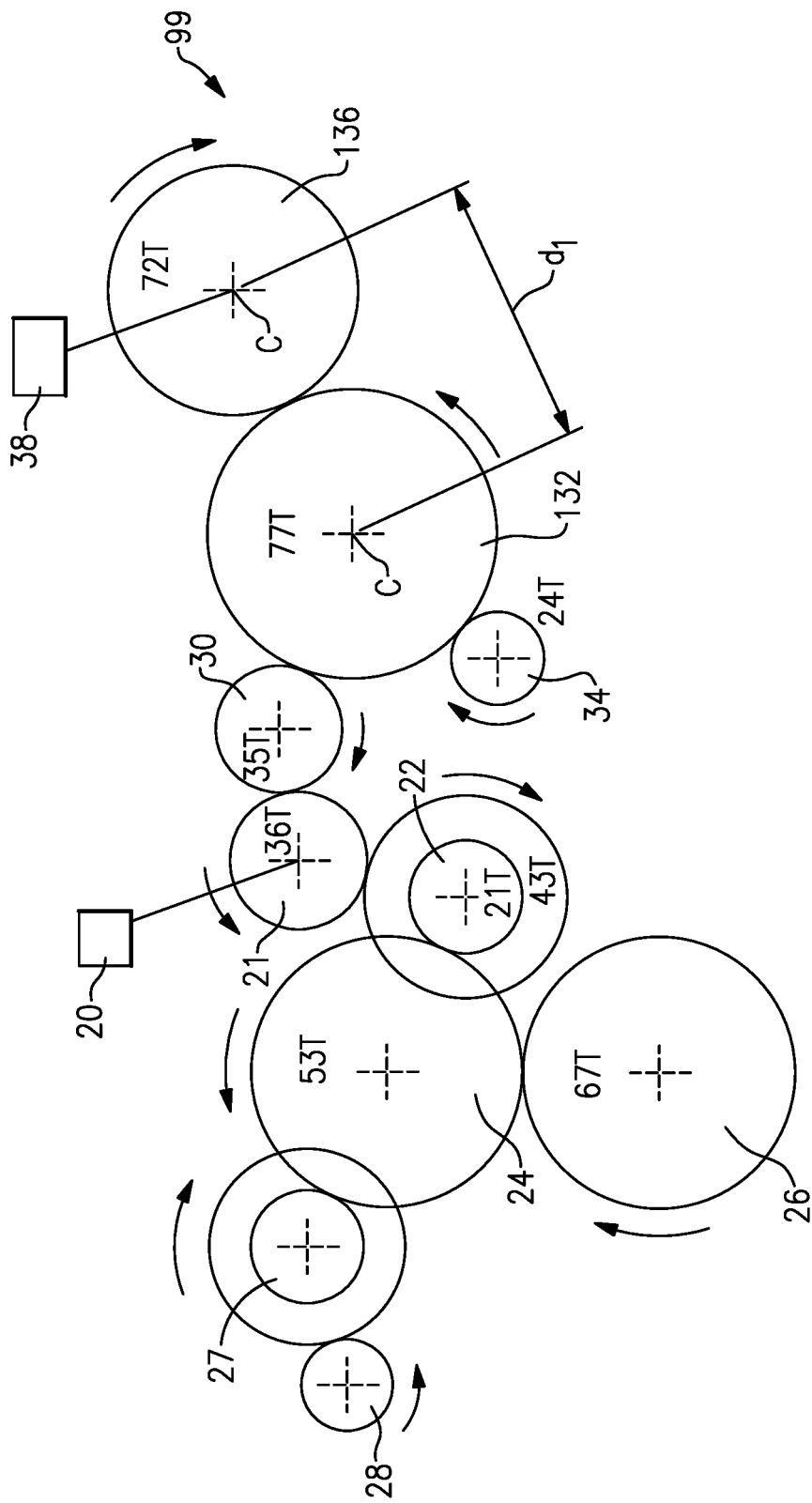
FIG. 2 shows a first modified gearbox.

FIG. 2 shows a unique gearbox 99, and a method of achieving the unique gearbox 99, such that the speed of a fuel pump 38 changes. In the gearbox 99, as illustrated in FIG. 2, the bulk of the gears remain the same as to FIG. 1. However, the idler gear 32 is replaced with an idler gear 132 and the pump drive gear 36 is replaced with the pump drive gear 136. The idler gear 132 now has 77 teeth, whereas the gear 32 has 79 teeth. The gear 136 now has 72 teeth whereas the gear 36 had 67 teeth. This now results in the speed at the pump 38 being reduced relative to the speed in the FIG. 1 pump 38.

In addition, the tooth thickness on the gears 21, 30, 22, and 34 are all changed.

In FIG. 2, it can be seen that the numbers of teeth in gears 132 and 136 are different from the numbers of teeth in gears 32 and 36 from FIG. 1. Because a central tenet of gear design suggests that the pitch circles of any given gear mesh should be tangent with each other, the diametral pitch of the gears 132 and 136 is changed in order for the new pitch circles to be tangent with each other at the specified center distance, $d_1$. Even though this new diametral pitch value is non-standard for the specified center distance, it can be used as long as standard rules for designing the gear cutting tools are applied. In other words, non-standard diametral pitch values for defining the size of the gear tooth can be used, as long as standard rules for designing the gear cutting tools are still maintained.

For the embodiment in FIG. 2, a new, non-standard diametral pitch is used to define the gears 132 and 136. Gears that interact with gears 132 and 136 are changed to be adaptable with the non-standard diametral pitch value. For this reason, gears 21, 22, 30, & 34 are designed to the new diametral pitch value, even though their numbers of teeth have not changed.

The distance $d_1$ between the center C of the gears 132 and 136 remains the same distance d1 between gears in FIG. 1. Thus, the gears can sit on the same pads in the gearbox housing. Because the diametral pitch value of the gears in the first embodiment, FIG. 2, is different, other secondary dimensions that are dependent on the size of the gear tooth will also change. As a result, the outside diameter, root diameter, and tooth thickness will likely change, even if by only a small amount. The face widths of the gears have a good chance of staying the same, but it may be necessary to adjust the face widths if updated stress analysis results dictate changes to them.

Figure 3:
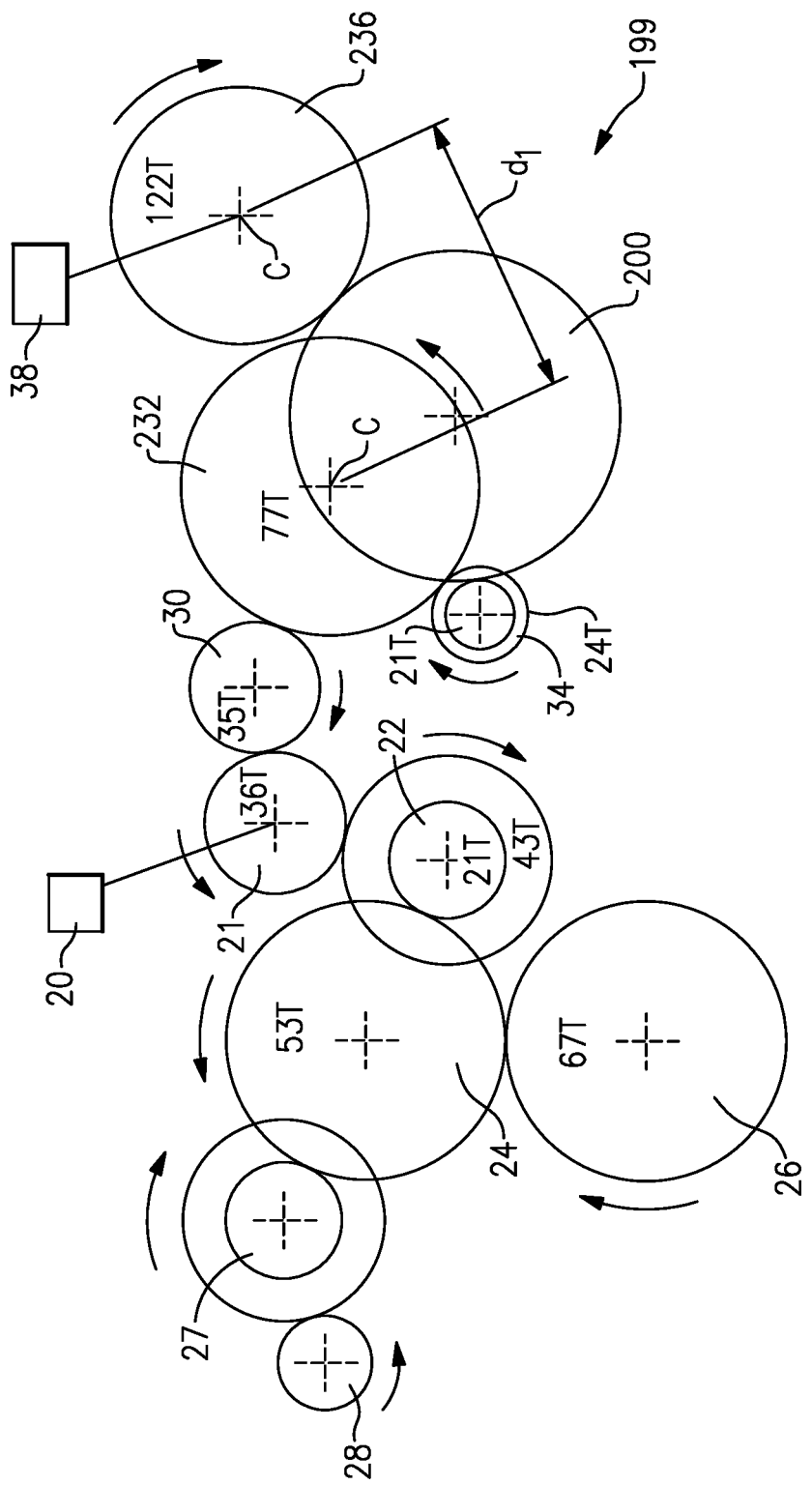
FIG. 3 shows a second embodiment.

FIG. 3 shows a gearbox 199 wherein the distinct speed at the fuel pump 38 is again achieved. In this gearbox, the idler gear 232 is again changed to have 77 teeth, but the fuel pump gear 236 is changed to have 122 teeth. The distance between the centers C of the two gears remains at $d_1$ such that they can fit within the same gear mount pads. However, a second idler gear 200 is added to transmit rotation from the gear 234 to the gear 236.

FIG. 4A shows the original gearbox 210, and the addition of a supplemental gearbox 211. It should be understood that FIG. 4A (much like FIG. 5) is somewhat inaccurate in that the gear 34 as shown in the gearbox 211 would actually be spaced into the paper relative to the gear 232. An extension 212 is shown in FIG. 4A to represent the 24 toothed portion of the gear 34, which will engage and be driven with the idler gear 232. The 21 toothed gear portion of the gear 34 engages a second idler gear 200 to in turn drive the fuel pump drive gear 236.

FIG. 4B is an alternative view showing that the supplemental gearbox 211 is spaced in a plane perpendicular to the axis of rotation of the gears such that the gear 34 has its 24 toothed portion engaged and driven with the gear 232 (again at its 24 toothed portion) and a gear 34 engages and drives the gear 200. As is clear from FIG. 3, the actual centerlines of the gears may be closer, and there may in fact be overlap between the idler gears 200 and 232 as shown in FIG. 3. The supplemental gearbox is beneficial in that it provides mounting pads for the additional gear 200 to be added.

Figure 5:
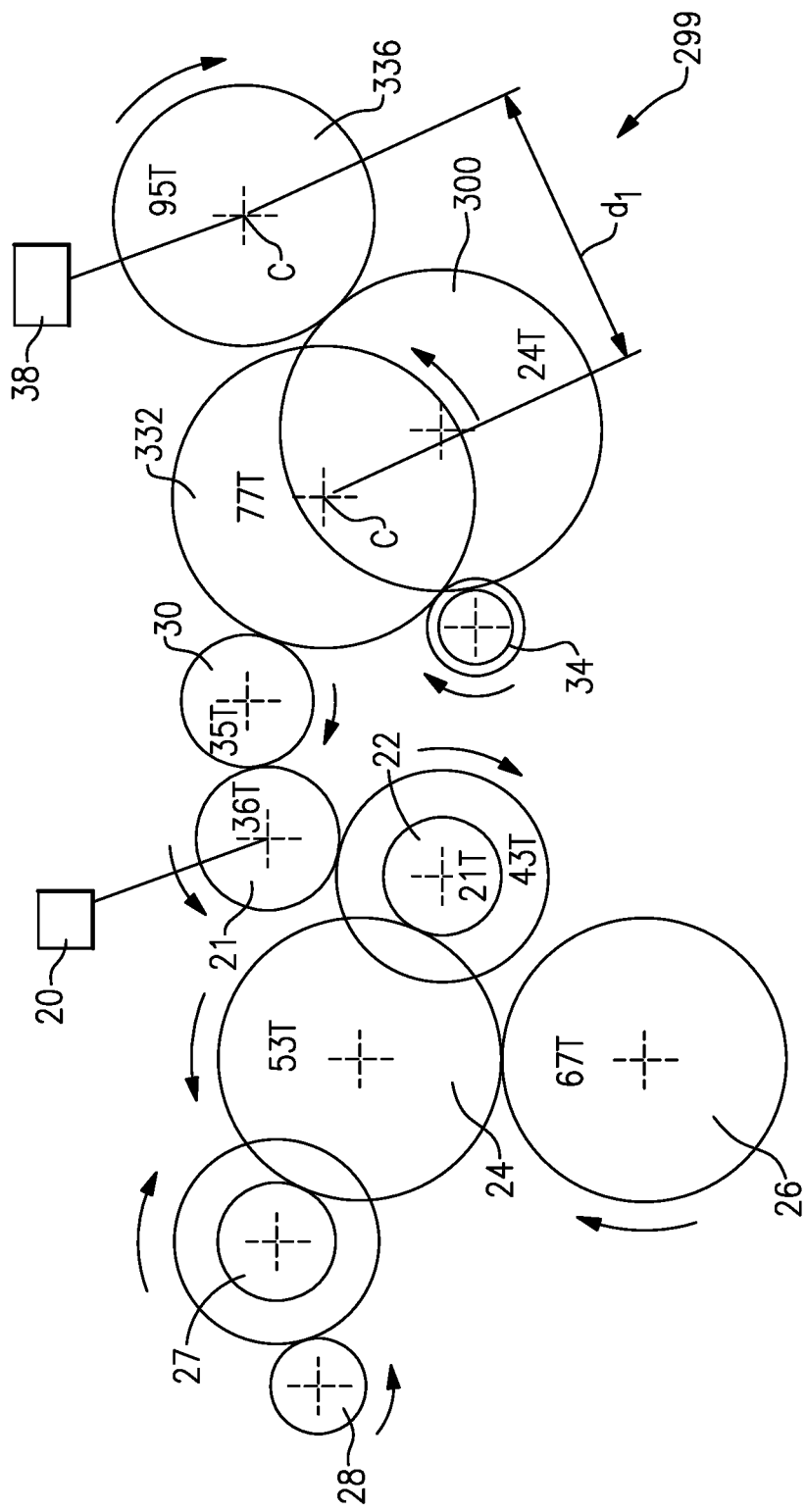
FIG. 5 shows a third embodiment.

FIG. 5 shows a gearbox 299 that again achieves a distinct speed at the fuel pump 38. The gear 332 again has 77 teeth, but the gear 336 now has 95 teeth. The distance $d_1$ between the centers C of the gears 332 and 336 is the same distance $d_1$. The idler gear 300 is provided with 24 teeth as is the gear 200.

The gearbox 299 of FIG. 5 may also be provided with a supplemental gearbox similar to the gearbox 211 shown in FIG. 4B.

In standard gear design the gears 32 and 36 are typically "standard" meaning a ratio of their diameter to the number of teeth on each of the engaged gears will be equal and in proportion to a standard pitch specification. However, in each of the disclosed embodiment the gears are non-standard meaning that, while the gears 132 and 136 still have ratios that are proportional to their respective pitch diameters, these diameters are derived using a non-standard pitch in order to enable the gears to operate at the same $d_1$ diameter, even though the numbers of teeth have changed.

A method of retrofitting an existing gearbox could be said to include an existing gearbox having an input shaft connected to drive a first idler gear. The first idler gear engages a first fuel pump gear for driving a fuel pump at a first speed. There is a first distance between a center point of the first idler gear and the fuel pump gear. The method includes a step of replacing the first idler gear with a replacement first idler gear having a distinct number of teeth, and replacing the first fuel pump gear with a replacement fuel pump gear having a distinct number of teeth such that a speed output to the fuel pump is distinct from the first speed.

This disclosure provides unique gearboxes that achieve a distinct speed at a fuel pump and a method of modifying a speed ratio of one output gear in a gearbox.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A method of retrofitting a gas-turbine gearbox, the method comprising:
   providing the gas turbine gearbox, the gearbox having a first idler gear engaged with a first fuel pump gear configured to be drivingly coupled to a fuel pump, there being a first distance between a center point of the first idler gear and a center point of the fuel pump gear;
   removing the first idler gear;
   replacing the first idler gear with a replacement idler gear having a different number of gear teeth than the first idler gear;
   removing the first fuel pump gear;
   replacing the first fuel pump gear with a replacement fuel pump gear having a different number of gear teeth than the first fuel pump gear;
   wherein a distance between a center point of the replacement idler gear to a center point of the replacement fuel pump gear is the same as the first distance; and
   wherein a speed output to the fuel pump is altered after the retrofit.

2. The method as set forth in claim 1, wherein the method further includes a second idler gear rotating with said replacement fuel pump gear, and engaging a drive gear for a generator and said second idler gear driving said replacement fuel pump gear.

3. The method as set forth in claim 2, wherein said first idler gear has 79 teeth and said replacement first idler gear has 77 teeth.

4. The method as set forth in claim 3, wherein said second idler gear has 24 teeth.

5. The method as set forth in claim 4, wherein said fuel pump drive gear has 67 teeth and said replacement fuel pump drive gear has 122 teeth.

6. The method as set forth in claim 3, wherein said fuel pump drive gear has 67 teeth and said replacement fuel pump drive gear has 122 teeth.

7. The method as set forth in claim 2, wherein said fuel pump drive gear has 67 teeth and said replacement fuel pump drive gear has 122 teeth.

8. The method as set forth in claim 4, wherein said fuel pump drive gear has 67 teeth and said replacement fuel pump drive gear has 95 teeth.

9. The method as set forth in claim 3, wherein said fuel pump drive gear has 67 teeth and said replacement fuel pump drive gear has 95 teeth.

10. The method as set forth in claim 3, wherein said replacement fuel pump gear and a gear driving said replacement fuel pump gear have diameters derived using a non-standard pitch.

11. The method as set forth in claim 2, wherein said fuel pump drive gear has 67 teeth and said replacement fuel pump drive gear has a 95 teeth.

12. The method as set forth in claim 2, wherein said replacement fuel pump gear and a gear driving said replacement fuel pump gear have diameters derived using a non-standard pitch.

13. The method as set forth in claim 2, wherein a supplemental gearbox is mounted to an existing gearbox and houses a portion of said drive gear for said generator, said second idler gear, and said replacement fuel pump gear.

14. The method as set forth in claim 1, wherein said fuel pump drive gear has 67 teeth and said replacement fuel pump gear has 72 teeth.

15. The method as set forth in claim 14, wherein said replacement fuel pump gear and a gear driving said replacement fuel pump gear have diameters derived using a non-standard pitch.

16. The method as set forth in claim 1, wherein said replacement fuel pump gear and a gear driving said replacement fuel pump gear have diameters derived using a non-standard pitch.

* * * * *